US012570506B1

(12) United States Patent
Konopacki et al.

(10) Patent No.: US 12,570,506 B1
(45) Date of Patent: Mar. 10, 2026

(54) SYSTEM AND METHOD FOR HITCH RACK CARRYING APPARATUS

(71) Applicants: Nick Konopacki, Waunakee, WI (US);
Adam Marten, Mcfarland, WI (US)

(72) Inventors: Nick Konopacki, Waunakee, WI (US);
Adam Marten, Mcfarland, WI (US)

( * ) Notice: Subject to any disclaimer, the term of this patent is extended or adjusted under 35 U.S.C. 154(b) by 0 days.

(21) Appl. No.: 19/224,827

(22) Filed: Jun. 1, 2025

Related U.S. Application Data

(60) Provisional application No. 63/693,873, filed on Sep. 12, 2024.

(51) Int. Cl.
| | |
|---|---|
| B60R 9/06 | (2006.01) |
| B60R 9/10 | (2006.01) |
| B60S 9/08 | (2006.01) |
| B62B 5/00 | (2006.01) |
| B66F 5/02 | (2006.01) |

(52) U.S. Cl.
CPC ............... B66F 5/025 (2013.01); B60R 9/06 (2013.01); B60R 9/10 (2013.01); *B60S 9/08* (2013.01); *B62B 5/0003* (2013.01)

(58) Field of Classification Search
CPC .. A61M 5/1415; Y10T 292/1082; F16B 2/02; B66F 5/025; B60S 9/08; B62B 5/0003
USPC .................................................. 254/420, 7 R
See application file for complete search history.

(56) References Cited

U.S. PATENT DOCUMENTS

| | | | | |
|---|---|---|---|---|
| 3,870,177 | A | * | 3/1975 | Cobb ........................ B62B 1/14 414/607 |
| 4,457,492 | A | | 7/1984 | Lahti |

| | | | |
|---|---|---|---|
| 6,371,449 | B1 | 4/2002 | Chamberlain |
| 6,579,055 | B1 | 6/2003 | Williams |
| 6,595,398 | B2 | 7/2003 | Himel, Jr. |
| 6,966,542 | B2 | 11/2005 | Bettencourt |
| 7,066,448 | B2 | 6/2006 | Thurm |
| 7,225,900 | B2 | 6/2007 | Fox |
| 7,341,417 | B1 * | 3/2008 | Lohr ........................ B60R 9/06 224/525 |

(Continued)

FOREIGN PATENT DOCUMENTS

| | | |
|---|---|---|
| DE | 202012009377 U1 | 11/2012 |
| DE | 102015100603 A1 | 7/2016 |

(Continued)

OTHER PUBLICATIONS

Wheeled Bicycle Rack moving and positioning device Found at: You Won't Believe How Easy This Bike Rack Is! https://www.youtube.com/watch?v=2gtTDGFpEcc (Year: 2025).*

(Continued)

*Primary Examiner* — Mahdi H Nejad
(74) *Attorney, Agent, or Firm* — Bold IP, PLLC; Christopher Mayle

(57) ABSTRACT

A system for positioning a hitch rack for attachment to a vehicle hitch receiver, comprising: a body; a transportation base coupled to the body, the transportation base having a plurality of wheel assemblies that facilitate rolling of the system along a ground surface and a support member coupled to the body, the support member configured to receive and support the hitch rack; the system having an adjusting gear mechanism coupled to the support member and the body, the adjusting gear mechanism configured to adjust a height of the support member relative to the transportation base.

9 Claims, 10 Drawing Sheets

(56) References Cited

U.S. PATENT DOCUMENTS

| | | | |
|---|---|---|---|
| 8,783,536 B1 | 7/2014 | Julian | |
| 9,315,366 B2 | 4/2016 | Gann et al. | |
| 10,562,463 B1 * | 2/2020 | Speer | B60R 9/06 |
| 10,604,080 B2 * | 3/2020 | Ni | B60R 9/06 |
| 11,673,511 B2 | 6/2023 | Shaw et al. | |
| 11,905,151 B2 | 2/2024 | Budd | |
| 11,926,292 B1 * | 3/2024 | Strogen | F16H 1/14 |
| 2003/0221914 A1 | 12/2003 | Smith et al. | |
| 2004/0004099 A1 | 1/2004 | Crouch | |
| 2005/0079037 A1 | 4/2005 | Boyd | |
| 2005/0169736 A1 * | 8/2005 | Decky | B62B 1/002 |
| | | | 414/490 |
| 2009/0309331 A1 * | 12/2009 | Ryan | B60B 33/0049 |
| | | | 187/219 |
| 2012/0000952 A1 * | 1/2012 | Dreger | B60R 9/10 |
| | | | 224/533 |
| 2012/0145978 A1 * | 6/2012 | Rich | B62B 3/0637 |
| | | | 254/2 R |
| 2013/0022434 A1 * | 1/2013 | Uttech | B66F 9/065 |
| | | | 414/495 |
| 2013/0181418 A1 * | 7/2013 | Burton | B62B 1/12 |
| | | | 280/47.19 |
| 2019/0105528 A1 * | 4/2019 | Bardakci | A63B 23/14 |
| 2020/0361426 A1 * | 11/2020 | Wang | B60S 9/08 |
| 2023/0001860 A1 | 1/2023 | Schroeder | |
| 2023/0264770 A1 | 8/2023 | Maclaskey et al. | |
| 2024/0300270 A1 * | 9/2024 | Farris | B60D 1/465 |

FOREIGN PATENT DOCUMENTS

| | | | | |
|---|---|---|---|---|
| DE | 202020002350 U1 * | 9/2020 | | B60R 9/10 |
| EP | 1818219 A1 | 8/2007 | | |

OTHER PUBLICATIONS

A Vehicle Towing Device; Document ID: CN 112706699 A; Date Published: Apr. 27, 2021; Inventor: Hu, Shao-min; Application No. CN 201911015311 A; Date Filed: Oct. 14, 2019 (Year: 2021).*

"Bike Rack Dolly," etsy.com. https://www.etsy.com/listing/1032598872/bike-rack-dolly?gpla=1&gao=1& [Date accessed: Mar. 7, 2024].

* cited by examiner

132

136

132

124

122

SYSTEM AND METHOD FOR HITCH RACK CARRYING APPARATUS

CROSS REFERENCE TO RELATED APPLICATIONS

This application claims priority to U.S. Provisional Patent Application No. 63/693,873 filed on Sep. 12, 2024, and is incorporated in its entirety.

FIELD OF THE DISCLOSURE

The overall field of this invention relates to bicycle racks, and in particular a transportation device for positioning the bicycle rack in place on the rear of a vehicle for transportation.

BACKGROUND

Hitch-mounted bicycle carriers or hitch racks, serve an important purpose for cyclists and other outdoor enthusiasts. These devices allow people to easily transport their bicycles to destinations that may be too far to cycle to directly, opening up a wider range of cycling opportunities. They are particularly useful for accessing remote trails, participating in cycling events, or taking bikes on vacation. Hitch racks enable cyclists to combine the convenience of driving with the enjoyment and health benefits of cycling once they reach their destination. However, the hitch racks themselves are heavy and difficult to transport for installation. Thus exists the need for a new apparatus that helps move the hitch racks to the hitch on the vehicle and position the hitch rack in place.

SUMMARY

The present invention is directed to a system and method for an apparatus that has a wheeled base and a jack or crankshaft for lifting a loaded hitch rack vertically so that the hitch rack can be attached to a vehicle tow hitch receiver. The apparatus has a support system for lifting a bicycle rack into position for attachment to a vehicle hitch receiver. The apparatus is configured to receive and support a hitch rack. The hitch rack can be lifted or lowered via a jack, crank screw, or other drive means. The support system may have a wheeled base that provides stability for the hitch rack stand and allows users to roll, lift, or stand the vertical frame with handle.

In some aspects, the techniques described herein relate to a system for positioning a hitch rack for attachment to a vehicle hitch receiver, including: a body; a transportation base coupled to the body, the transportation base having a plurality of wheel assemblies that facilitate rolling of the system along a ground surface; a support member coupled to the body, the support member configured to receive and support the hitch rack; and an adjusting gear mechanism coupled to the support member and the body, the adjusting gear mechanism configured to adjust a height of the support member relative to the transportation base.

In some aspects, the techniques described herein relate to a system, further including a handle coupled to the body, wherein the handle is configured to facilitate transportation of the system.

In some aspects, the techniques described herein relate to a system, wherein the support member includes: an L-shaped arm having a vertical portion extending upward alongside the body and a horizontal portion extending perpendicular to the vertical portion.

In some aspects, the techniques described herein relate to a system, further including a support bracket coupled to the horizontal portion of the L-shaped arm, the support bracket configured to receive the hitch rack.

In some aspects, the techniques described herein relate to a system, further including a support belt coupled to the vertical portion of the L-shaped arm, the support belt configured to secure the hitch rack to the support member.

In some aspects, the techniques described herein relate to a system, wherein the support bracket includes a plurality of apertures configured to receive position locking pins for fastening the support bracket to the horizontal portion of the L-shaped arm.

In some aspects, the techniques described herein relate to a system, wherein the support belt includes: a U-shaped structure having two prongs extending outward from the support member; and a release buckle coupled to the two prongs, the release buckle including an adjustable strap with a male component connected to a first prong of the two prongs and a female component connected to a second prong of the two prongs.

In some aspects, the techniques described herein relate to a system, wherein the adjusting gear mechanism includes: a first meshing gear in a horizontal configuration; a second meshing gear in a vertical configuration that mates with the first meshing gear; and a vertical shaft coupled to the second meshing gear.

In some aspects, the techniques described herein relate to a system, further including a hand crank coupled to the first meshing gear, wherein rotation of the hand crank causes vertical movement of the support member relative to the body, wherein the adjusting gear mechanism is configured to raise the support member when the hand crank is rotated in a first direction and lower the support member when the hand crank is rotated in a second direction opposite to the first direction.

In some aspects, the techniques described herein relate to a system, wherein the adjusting gear mechanism includes a motorized system having an internal DC motor and a gearbox controlled by a switch.

In some aspects, the techniques described herein relate to a system, wherein the handle includes: two vertical components extending upward from the body; two diagonal components coupled to the two vertical components; and a horizontal component coupled to the two diagonal components, wherein the horizontal component includes a gripping surface.

In some aspects, the techniques described herein relate to a system for positioning a bicycle rack for attachment to a vehicle hitch receiver, including: a wheeled base; a body coupled to the wheeled base; an L-shaped support arm coupled to the body, the L-shaped support arm having a vertical portion and a horizontal portion; a support bracket coupled to the horizontal portion of the L-shaped support arm, the support bracket configured to receive and support the bicycle rack; a support belt coupled to the vertical portion of the L-shaped support arm, the support belt configured to secure the bicycle rack to the L-shaped support arm; a lifting mechanism coupled to the L-shaped support arm and the body, the lifting mechanism configured to adjust a height of the L-shaped support arm relative to the wheeled base; and a handle coupled to the body for maneuvering the system.

In some aspects, the techniques described herein relate to a system, wherein the lifting mechanism includes a crank-operated gear system.

In some aspects, the techniques described herein relate to a system, wherein the support belt includes a horizontal adjustment system configured to adjust a horizontal position of the support belt relative to the body.

In some aspects, the techniques described herein relate to a system, wherein the horizontal adjustment system includes: a threaded rod oriented horizontally; an adjustment wheel coupled to the threaded rod; and a locking mechanism configured to lock the adjustment wheel in place.

In some aspects, the techniques described herein relate to a system, wherein the support bracket includes an H-shaped structure with a series of wings extending upward and downward from a middle plate.

In some aspects, the techniques described herein relate to a system for positioning and attaching multiple types of hitch racks to a vehicle hitch receiver, including: a body having a top plate with a plurality of apertures; a wheeled base coupled to a bottom portion of the body, the wheeled base including a plurality of legs with caster wheels; an L-shaped support member coupled to the body, the L-shaped support member including a vertical portion and a horizontal portion; a support bracket removably coupled to the horizontal portion of the L-shaped support member; a support belt removably coupled to the vertical portion of the L-shaped support member the support belt including an adjustable buckle system; a height adjustment mechanism housed within the body and coupled to the L-shaped support member, the height adjustment mechanism configured to vertically adjust the L-shaped support member relative to the wheeled base; and a handle coupled to the body through the plurality of apertures in the top plate.

In some aspects, the techniques described herein relate to a system, wherein the height adjustment mechanism includes: a gear system with a horizontal first gear and a vertical second gear that meshes with the horizontal first gear; a central vertical shaft coupled to the vertical second gear; and a removable hand crank coupled to the horizontal first gear.

In some aspects, the techniques described herein relate to a system, wherein the body includes a plurality of receptacles at the bottom portion of the body, the receptacles configured to receive ends of the handle.

In some aspects, the techniques described herein relate to a system, wherein the system is configured to support at least one of: platform-style racks, hanging-style racks, vertical racks, swing-away racks, tilting racks, and wheel mount racks.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figures 1A, 1B, 1C:
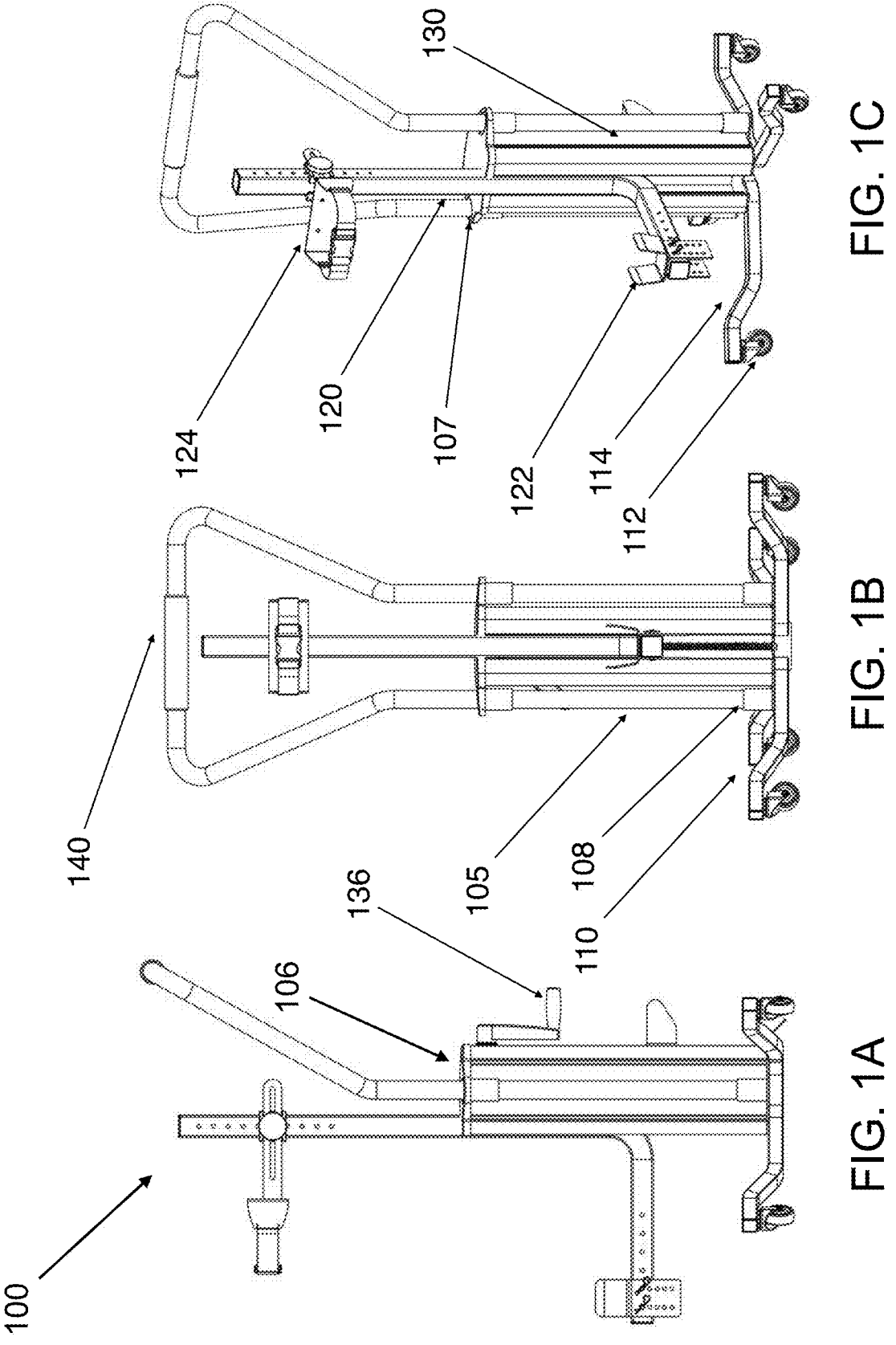
FIGS. 1A-C show views of one embodiment of the hitch rack carrying apparatus.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skills in the art to which this disclosure pertains.

With reference to FIGS. 1A-1C there are various illustrated views of hitch rack carrier 100, according to the preferred embodiment of the present invention. Hitch rack carrier 100 may be used to connect an attached hitch rack on the rear of a motor vehicle for a bicycle or any other apparatus that may be connected to a motor vehicle. For purposes of illustration, the motor vehicle may be described as an automobile, however, it should be noted that other motor vehicles, such as trucks, vans, and the like may also be utilized. Hitch rack carrier 100 may be used in combination with multiple types of hitch racks with different designs and configurations. Hitch racks that are compatible with hitch rack carrier 100 may include platform/tray-style racks where bicycles sit on individual trays or platforms, hanging-style racks where the bicycles hang by their top tube from arms on the rack, vertical racks where bicycles hang vertically, parallel to the back of the vehicle, swing-away racks which can swing to the side, allowing access to the vehicle's rear without removing bikes, tilting racks which tilt down to allow trunk or hatch access without fully removing the bicycles, and wheel mount racks which secure bicycles by the wheels only, with no frame contact.

Hitch rack carrier 100 may include various components such as a central body 105, a transportation base 110, a support member 120, an adjusting gear mechanism 130, and a handle 140.

Transportation base 110 may be positioned directly under or integrated into central body 105 and may provide support to hitch rack carrier 100 and come in contact with the ground or another surface during transportation of a hitch rack to a vehicle. Transportation base 110 may include a plurality of wheel assemblies 112 which may be coupled to distal ends of a plurality of legs 114 that extend outward in multiple opposing directions from central body 105 and a riddle of transportation base 110 and then upward above wheel assemblies 112 for further structural support. In the embodiment illustrated, there may be four legs 114 and four-wheel assemblies 112, however, this is non-limiting and may be any number or combination depending on the need and circumstances required, Each of the wheel assemblies 112 may include a wheel that facilitates rolling of hitch rack carrier 100 along a ground surface. In one non-limiting embodiment, the wheel assemblies 112 may include casters such that the wheels configured to swivel with respect to transportation base 110 which can allow for ease of rolling and positioning of hitch rack carrier 100 with respect to the ground surface in different directions.

Central body 105 may include an outer shell with a hollow interior for housing adjusting mechanism 130 and other components of bicycle rack carrier 100. The outer shell may be elongated and cylindrical but may also be any other shape or size. Central body 105 may have a top plate 106 at an upper surface of central body 105 with a plurality of apertures 107 which are designed for handle 140 to pass through and an indent for support member 120 for connecting central body 105 with a friction fit or one or more fasteners. Central body 105 may have a series of protrusions in the form of receptacles 108 at or near a bottom of central body 105 and above transportation base 110 that are vertically aligned with apertures 107 for receiving ends of handle 140.

Figures 2A, 2B, 2C:
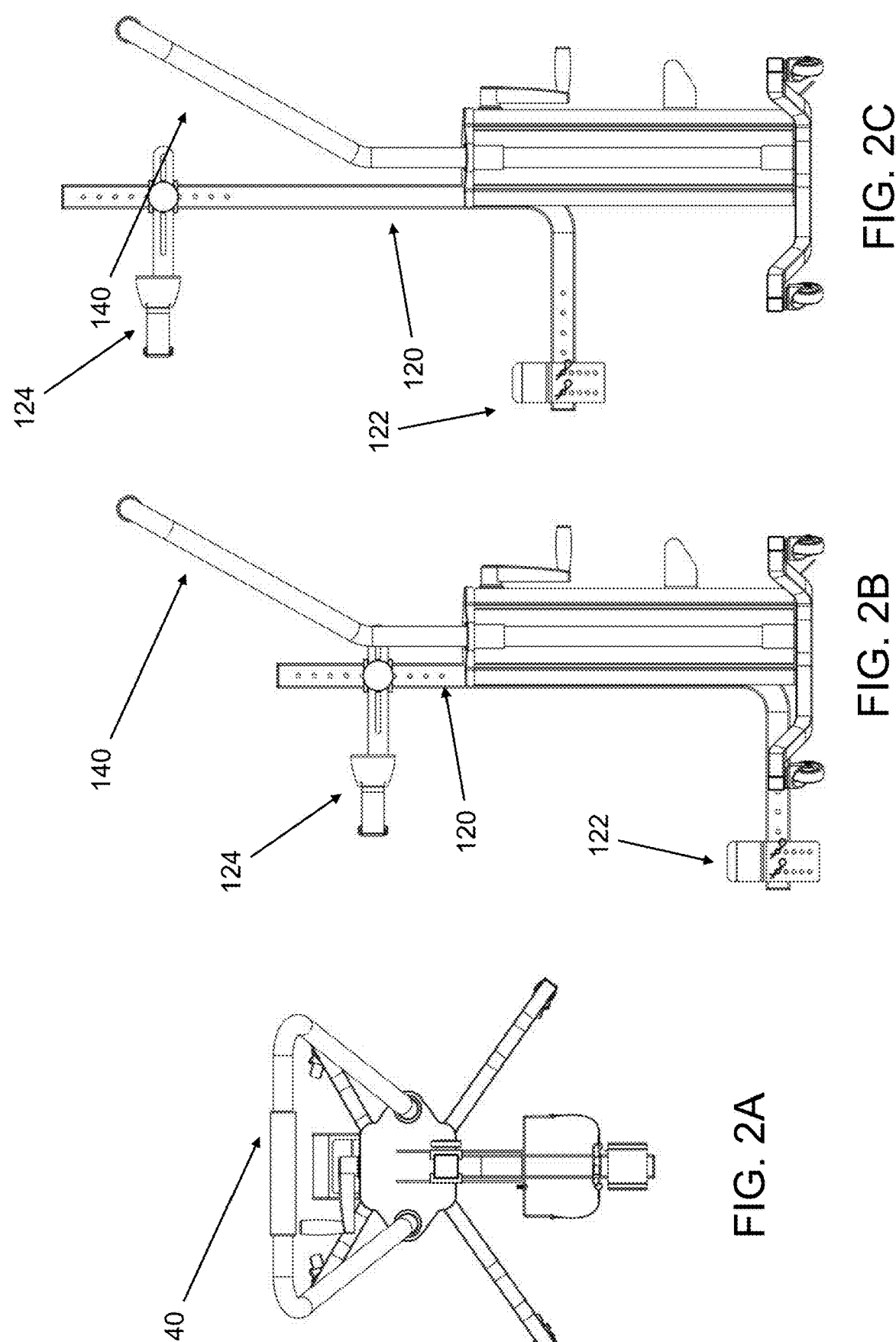
FIGS. 2A-C show more views of the hitch rack carrying apparatus.
Figure 3:
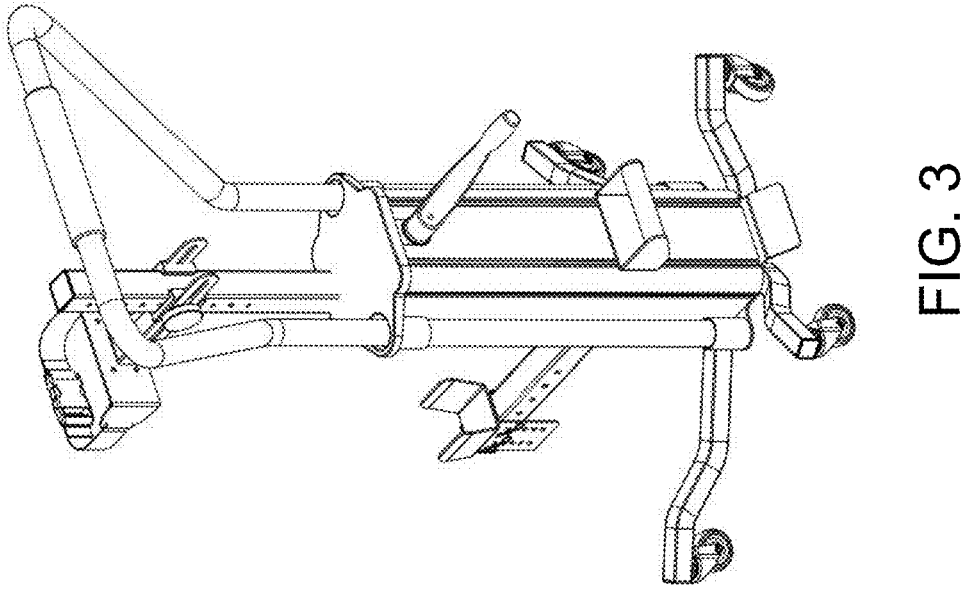
FIG. 3 shows another view of the hitch rack carrying apparatus.

Support member 120 may be in the form of an L-shaped arm, the L-shaped arm having a vertical portion extending upward alongside central body 105 and horizontal portion perpendicular to the surface, as illustrated in FIG. 2A-2C. Support member 120 may have a curved surface connecting the vertical portion and horizontal portion. Near the end of the horizontal portion may be one or more holes that extend through the horizontal portion whereby one or more positioned locking pins or other fasteners may secure a support bracket 122 to the horizontal portion, thus locking support bracket 122 at a position relative to central body 105. Near the end of the vertical portion may be one or more holes that extend through the vertical portion whereby one or more positioned locking pins or other fasteners may secure a support belt 124 to the vertical portion, thus locking support belt 124 at a position relative to the ground until raised or lowered as illustrated in FIG. 3.

Figure 5:
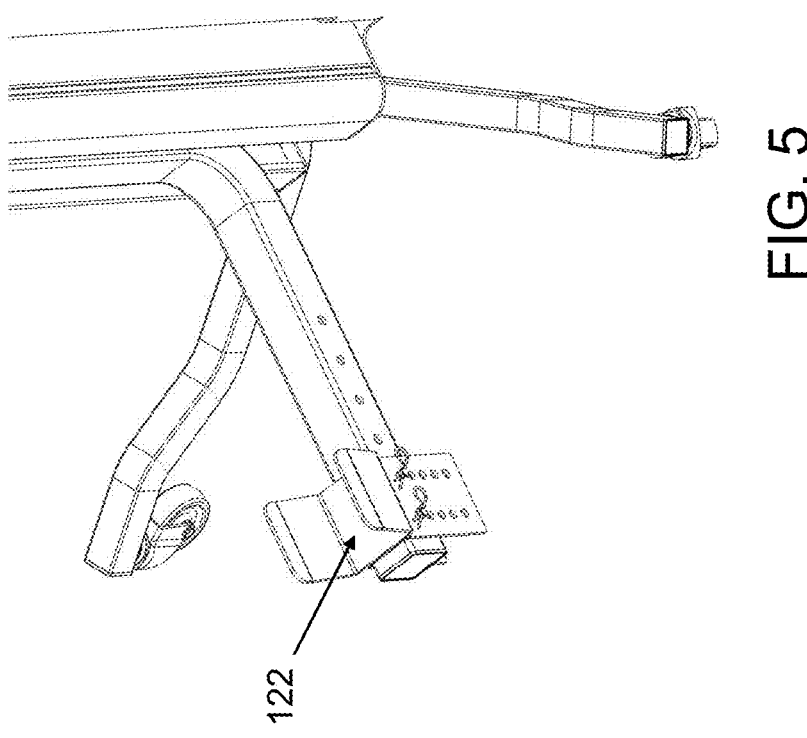
FIG. 5 shows the support bracket of the hitch rack carrying apparatus.

Support bracket 122, as illustrated in FIG. 5, may have a series of apertures for receiving position locking pins to be fastened to the horizontal portion of support member 120. Support bracket 122 may have a H-shape with a series of wings that extend upward and downward from support member 120 with a middle plate that rests directly above support member 120.

Figure 4:
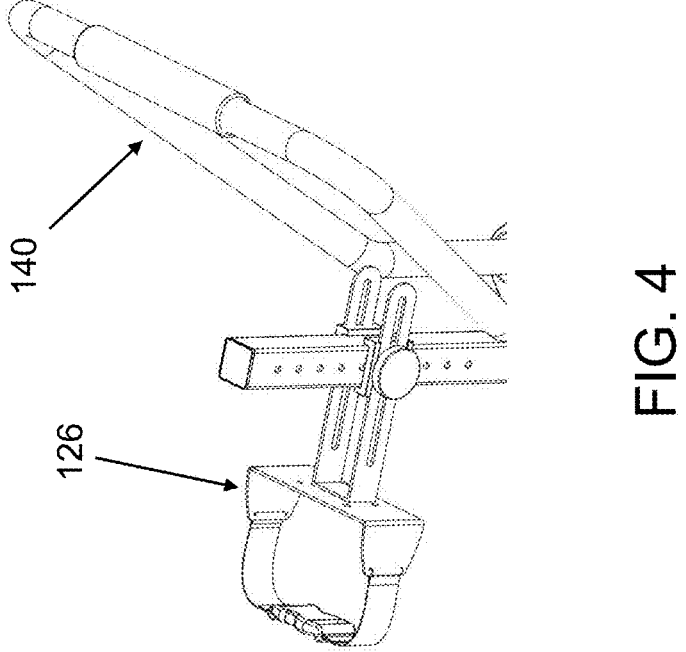
FIG. 4 shows the support belt of the hitch rack carrying apparatus.

Support belt 124, as illustrated in FIG. 4 may have a series of apertures for receiving position locking pins to be fastened to the vertical portion of support member 120. Support belt 124 may have a u-shape with two prongs extending outward from support member 120, whereby the two prongs are connected by a middle component at one end.

At the second end of the two prongs may be a release buckle including an adjustable strap with a male component connected to the first prong and a cooperating female component on an adjustable strap connected to the second prong such that the buckle may be adjusted to secure in any hitch rack placed on hitch rack carrier 100. To fasten the buckle, spring arms of the male component may be inserted into the opening of the female component with the center guide sliding into the center channel to align the male and female components. The spring arms of the male component expand into release openings of the female component as the buckle is closed with the shoulder of each spring arm engaging the edge of the release opening. To release the buckle, the user presses the spring arms together, to disengage them from release openings and thereby allow the male and female components to separate. The length of the strap may be adjusted by sliding the strap through the slots. When adjusting is not needed, the buckle may only have one slot.

Figure 6:
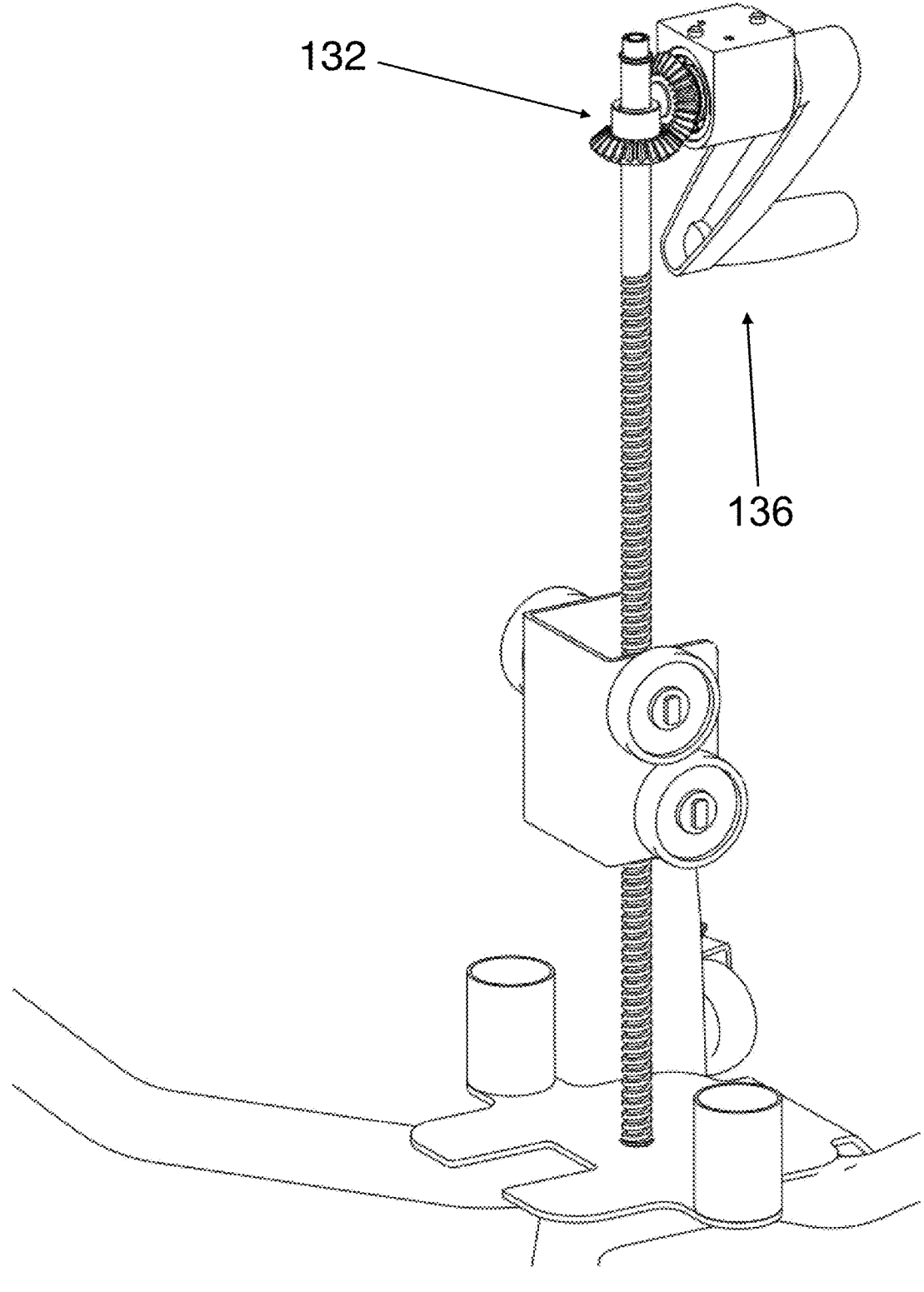
FIG. 6 show the adjusting mechanism of the hitch rack carrying apparatus.
Figure 7:
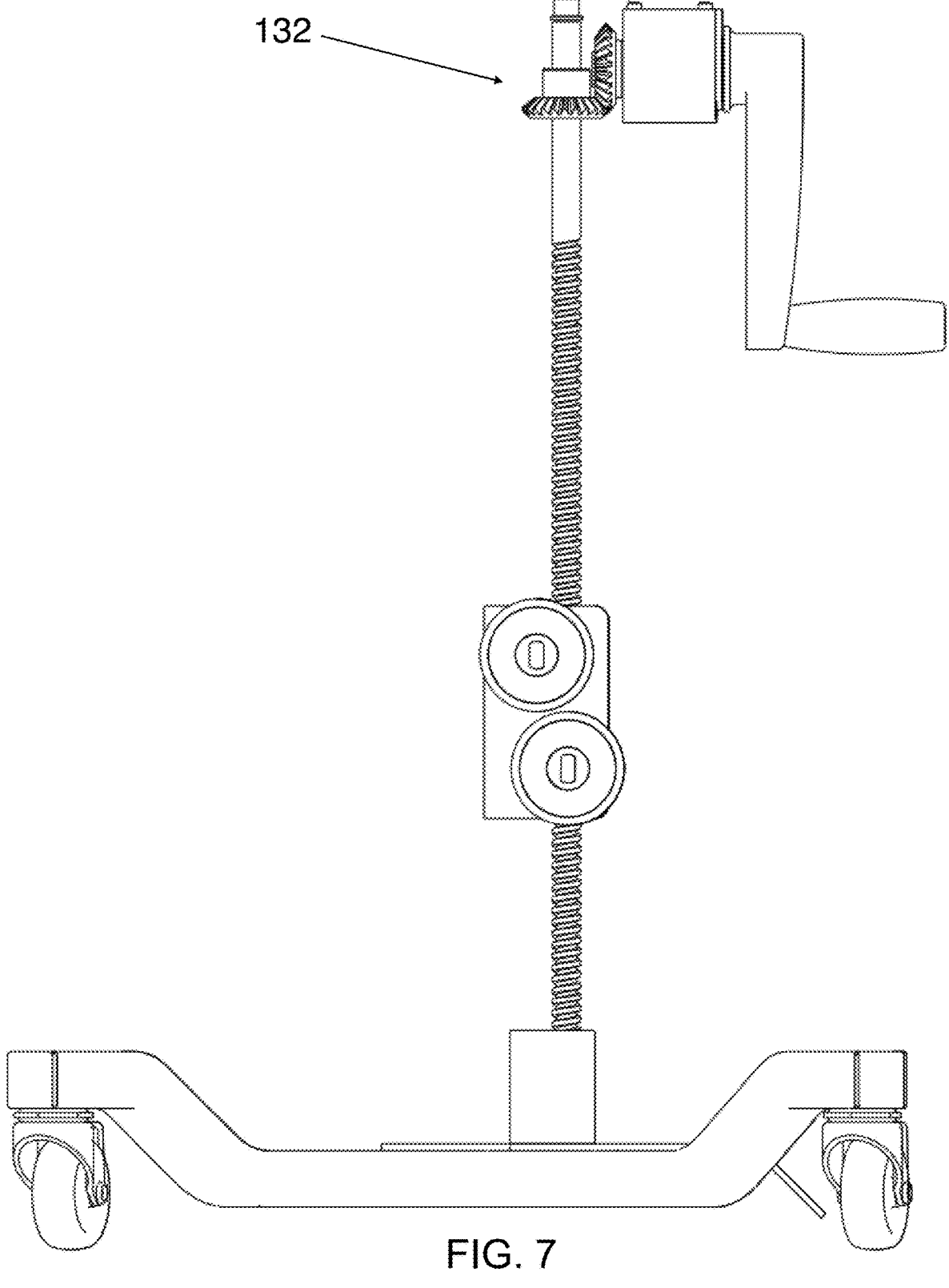
FIG. 7 show another view of the adjusting mechanism of the hitch rack carrying apparatus.
Figures 8A, 8B, 8C:
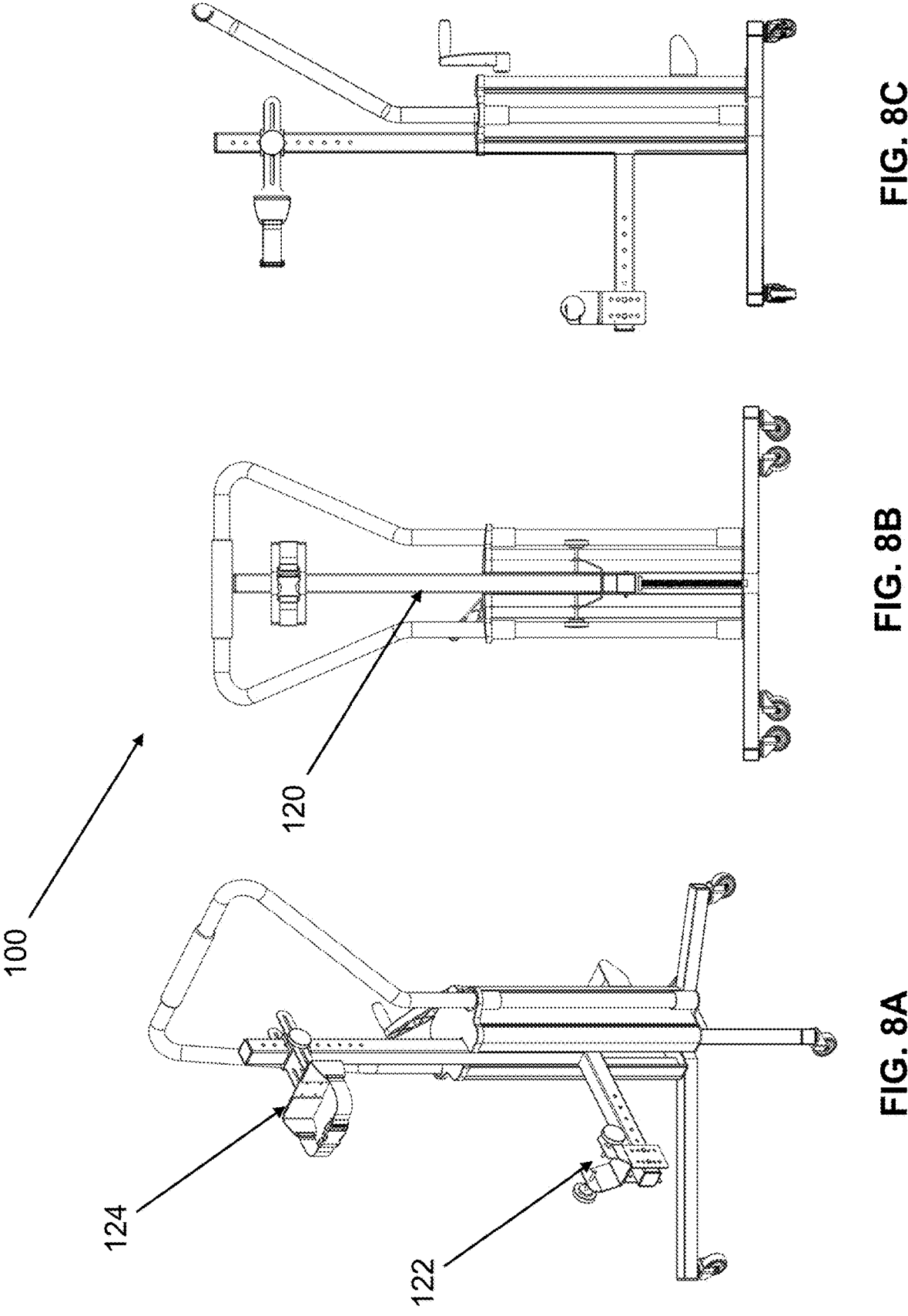
FIGS. 8A-C show views of another embodiment of the hitch rack carrying apparatus.
Figure 9B:
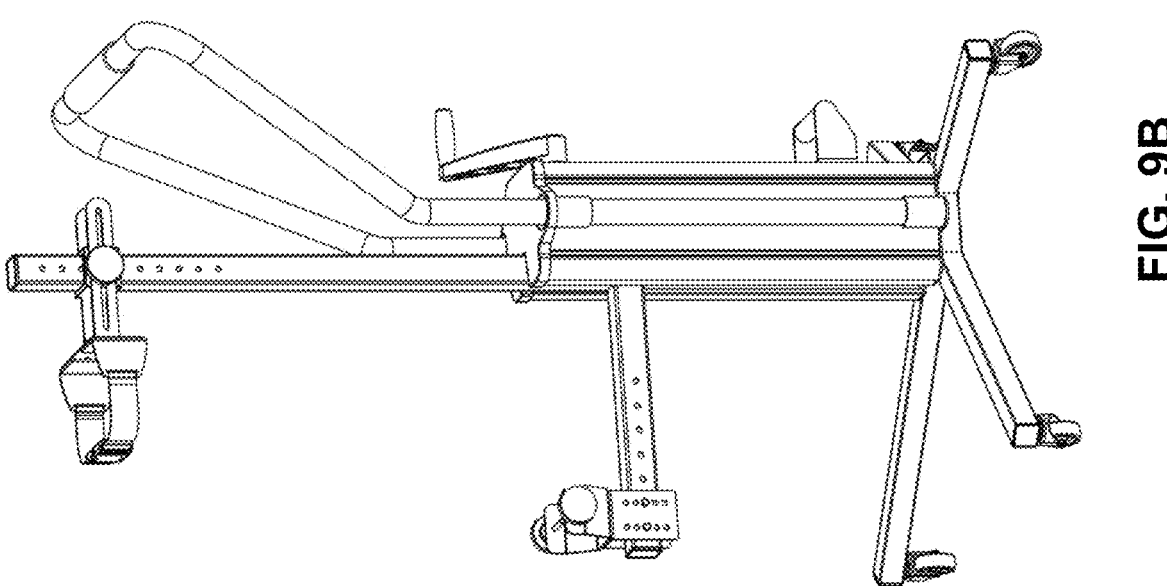
FIGS. 9A-B show more views of the hitch rack carrying apparatus.
Figure 9A:
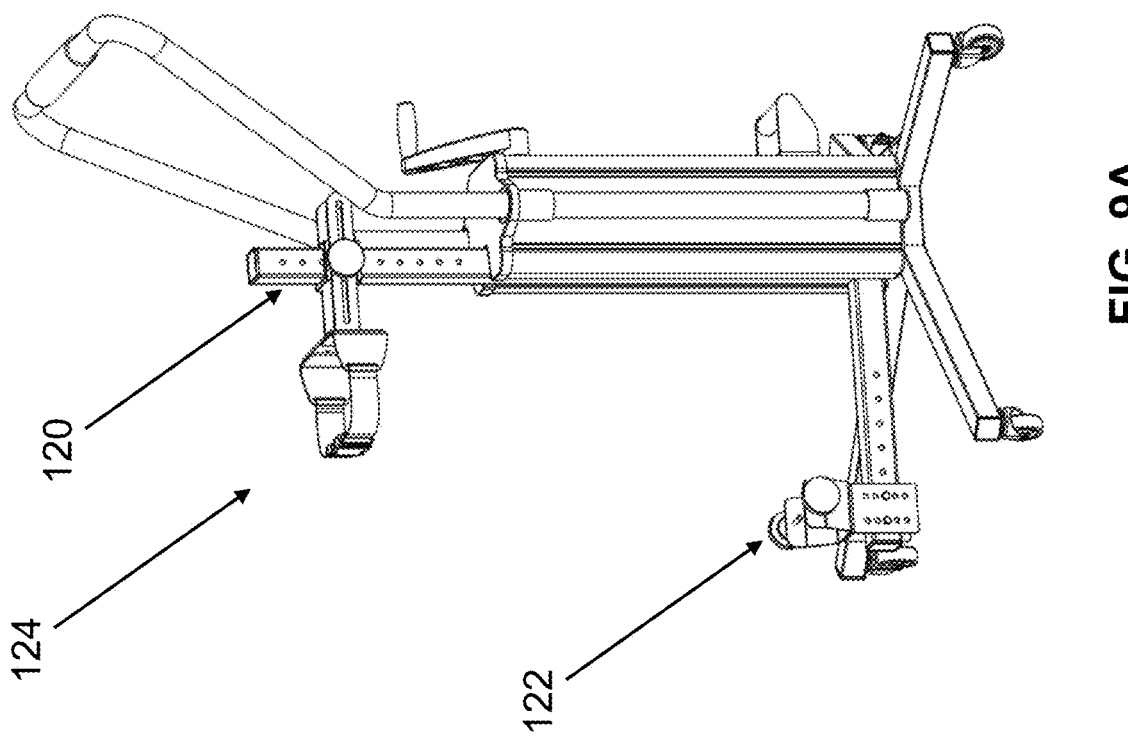
Figure 10B:
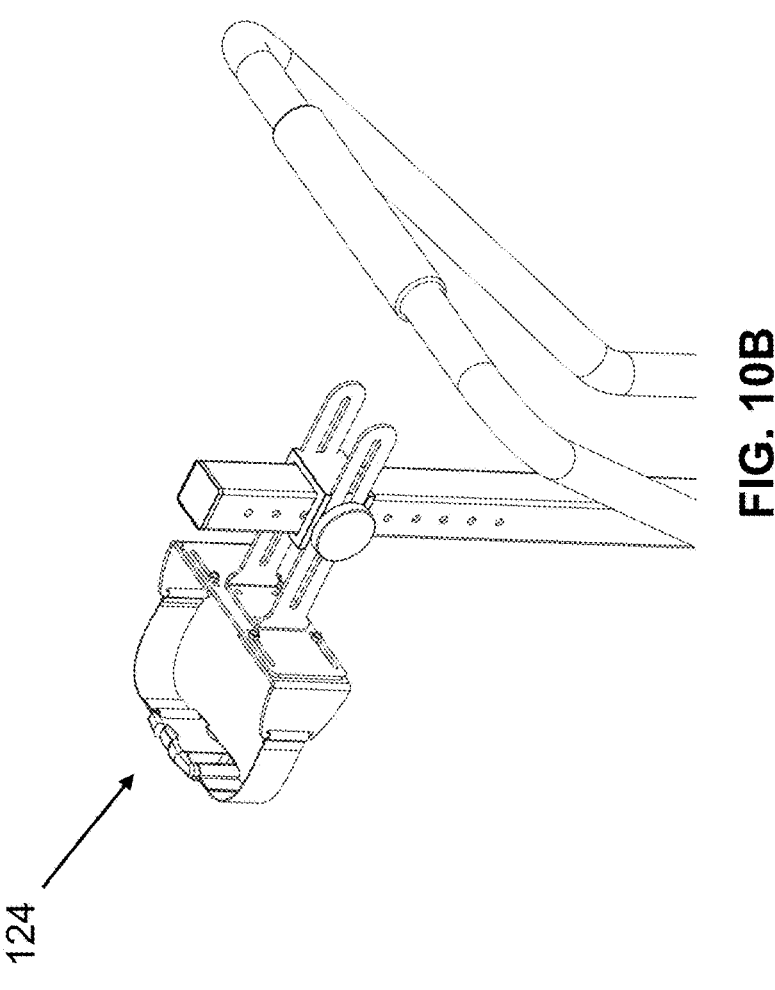
FIGS. 10A-B show the support belt and support bracket of the hitch rack carrying apparatus.
Figure 10A:
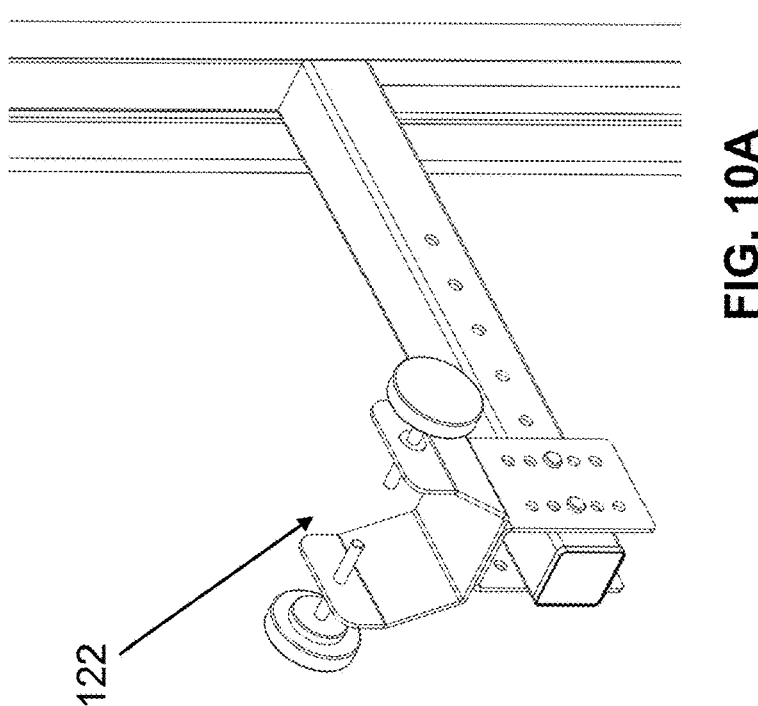
Figure 11B:
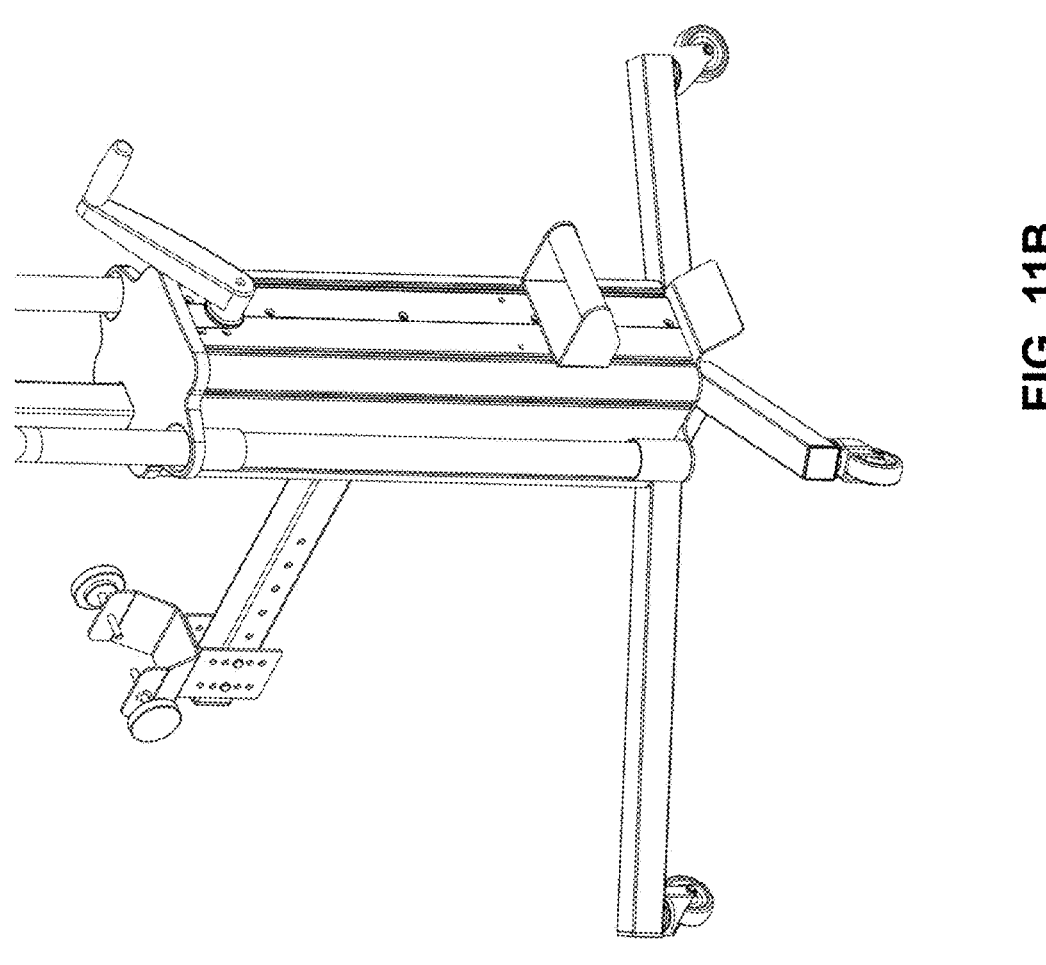
FIG. 11A-B show another view of the adjusting mechanism of the hitch rack carrying apparatus.
Figure 11A:
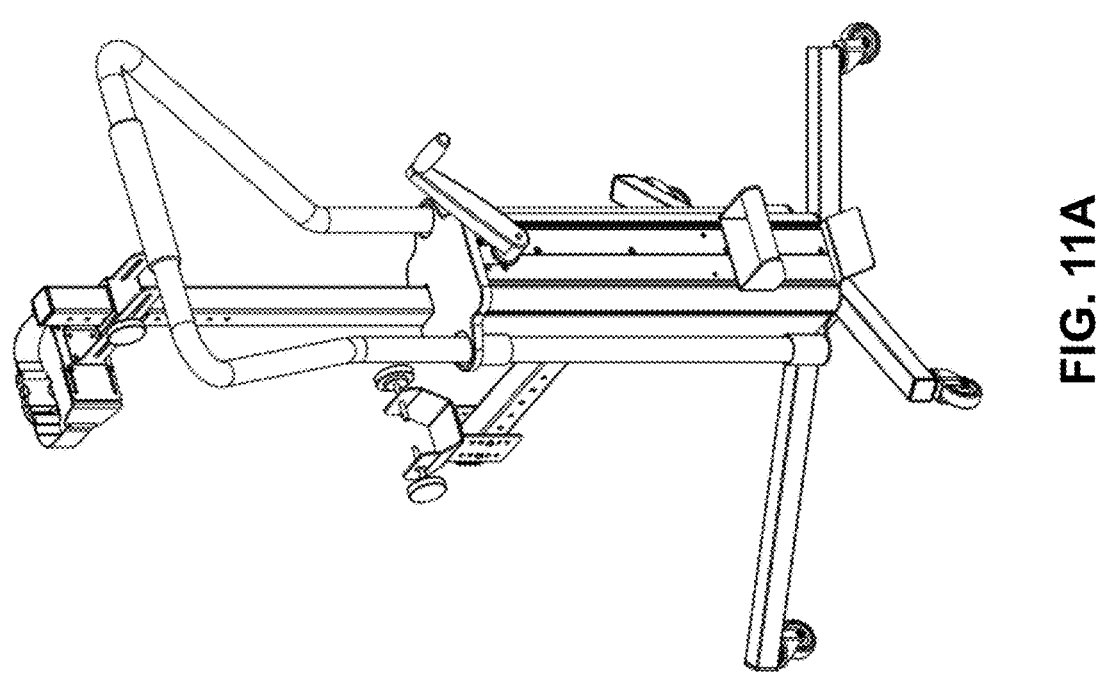

Adjusting gear mechanism 130 may have a gear connection 132 to be used to perform the actual adjustment of the support member 120 to increase elevation of the bicycle rack during operation by crank 136, as illustrated in FIGS. 6 and 7. The adjusting mechanism 130 may be turned in a first direction such as clockwise to lower support member in relation to the base section. Likewise, the adjusting mechanism may be turned in the opposite direction such as counterclockwise to raise support member 120 in relation to base section. Adjusting may include a first meshing gear. The crank shaft also supports the first meshing gear in a horizontal configuration. The first meshing gear of gear connection 132 mates with a second meshing gear of gear connection 132 in a vertical configuration. The second meshing gear may be supported by a bearing plate to maintain a fixed position in relation to the adjusting gear mechanism. The second meshing gear is retained by a bearing and is connected firmly to a central vertical shaft. Thus, it can be seen that as the central vertical shaft turns, the adjusting gear mechanism will move up and down in a corresponding manner.

A removable hand crank 136 may be provided to assist the user in said raising and lowering process. However, this is non-limiting and other versions of hitch rack carrier 100 may include a motor system having an internal DC motor and gearbox which is controlled by a switch which subsequently raises and lowers the support member. Also, hydraulic, drill, pneumatic, or other methods of raising and lowering support mechanisms are contemplated.

Support belt 124 may also have a horizontal adjustment system using an adjustment wheel for forward and backward movement away from center body 105. A threaded rod may be oriented horizontally and connected to the adjustment wheel on a smooth slot. Support belt 124 may be attached to the threaded rod via a threaded hole or nut. The rod and moving component may be supported by a fixed frame or base. As the wheel moves, the rod turns, causing support belt 124 to slide forward and backward along its length. When the user twists the wheel, it locks the wheel in place to hold its supporting position.

Handle 140 may be designed to provide stability and distribute the weight of hitch rack carrier 100 and any hitch racks placed upon it. Handle 140 may have two vertical components that extend upward from receptacles 108 and through aperture 107 whereby they may extend outward into a triangular shape with two diagonal components connected by a horizontal component. The horizontal component may have a gripping surface such as rubber gripping to facilitate transportation and help with comfort for the user.

To begin utilization, the user would lower support member 120 using crank 136 to the lowest position. The user would then position a hitch rack on support member 120 and fasten the hitch rack by placing the hitch rack on support bracket 122 and adjusting support belt 124 to be placed around the hitch rack. Next, the user would then transport the hitch rack using hitch rack carrier 100 by holding handle 140 and wheeling it to the vehicle. The user would then raise support member 120 using crank 136 to the desired position such that the connecting arm of the hitch rack is aligned with the receiving hitch.

The connecting arm may then be physically secured to the receiving hitch by use of a hitch restraining pin or other method. The user then may move the hitch rack carrier 100 away from the vehicle and store for later use.

FIG. 8 through FIG. 11 show several views of a second embodiment of hitch rack carrier 100. The collar of support belt 124 is solid on all four sides to prevent rocking. Holes are threaded on support member 120 for better connection. Support belt 124 is made of separate pieces to allow for adjustment capabilities. The mount for the connector for support bracket 122 is slid down to be flush with the horizontal tube of support member 120 to achieve the proper lift height. Quarter-inch 20 tightening knobs are provided on support bracket 122 for secure positioning. Support bracket 122 is extended by one inch with an additional drilled hole through it. Legs 114 are straight, with the front legs made two inches longer for improved stability. Finally, three-inch diameter wheels replaced the original two-inch wheels, for better mobility and weight distribution.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A system for positioning a hitch rack for attachment to a vehicle hitch receiver, comprising: a body; a transportation base coupled to the body, the transportation base configured to provide movement of the system along a ground surface; a support member coupled to the body, the support member configured to receive and support the hitch rack; an adjusting mechanism coupled to the support member and the body, the adjusting mechanism configured to adjust a height of the support member relative to the transportation base, wherein the support member comprises: an L-shaped arm having a vertical portion extending upward alongside the body and a horizontal portion extending perpendicular to the vertical portion, wherein a support bracket connected to the L-shaped arm and is configured to receive the hitch rack, wherein the support bracket comprises a plurality of apertures configured to receive position locking pins for fastening the support bracket to the horizontal portion of the L-shaped arm.

2. The system of claim 1, further comprising a handle coupled to the body, wherein the handle is configured to facilitate transportation of the system.

3. The system of claim 2, wherein the handle comprises: two vertical components extending upward from the body; two diagonal components coupled to the two vertical components; and a horizontal component coupled to the two diagonal components, wherein the horizontal component comprises a gripping surface.

4. The system of claim 1, further comprising a support belt coupled to the vertical portion of the L-shaped arm, the support belt configured to secure the hitch rack to the support member.

5. The system of claim 4, wherein the support belt comprises: a U-shaped structure having two prongs extending outward from the support member; and a release buckle coupled to the two prongs, the release buckle comprising an adjustable strap with a male component connected to a first prong of the two prongs and a female component connected to a second prong of the two prongs.

6. A system for positioning a bicycle rack for attachment to a vehicle hitch receiver, comprising: a wheeled base; a body coupled to the wheeled base; an L-shaped support arm coupled to the body, the L-shaped support arm having a vertical portion and a horizontal portion; a support bracket coupled to the horizontal portion of the L-shaped support arm, the support bracket configured to receive and support the bicycle rack; a support belt coupled to the vertical portion of the L-shaped support arm, the support belt configured to secure the bicycle rack to the L-shaped support arm; a lifting mechanism coupled to the L-shaped support arm and the body, the lifting mechanism configured to adjust a height of the L-shaped support arm relative to the wheeled base; and a handle coupled to the body for maneuvering the system, wherein the support belt comprises a horizontal adjustment system configured to adjust a horizontal position of the support belt relative to the body.

7. The system of claim 6, wherein the lifting mechanism comprises a crank-operated gear system.

8. The system of claim 6, wherein the horizontal adjustment system comprises: a threaded rod oriented horizontally; an adjustment wheel coupled to the threaded rod; and a locking mechanism configured to lock the adjustment wheel in place.

9. A system for positioning a bicycle rack for attachment to a vehicle hitch receiver, comprising: a wheeled base; a body coupled to the wheeled base; an L-shaped support arm coupled to the body, the L-shaped support arm having a vertical portion and a horizontal portion; a support bracket coupled to the horizontal portion of the L-shaped support arm, the support bracket configured to receive and support the bicycle rack; a support belt coupled to the vertical portion of the L-shaped support arm, the support belt configured to secure the bicycle rack to the L-shaped support arm; a lifting mechanism coupled to the L-shaped support arm and the body, the lifting mechanism configured to adjust a height of the L-shaped support arm relative to the wheeled base; and a handle coupled to the body for maneuvering the system, wherein the support bracket comprises an H-shaped structure with a series of wings extending upward and downward from a middle plate.

* * * * *